US010072342B2

(12) United States Patent
Prescott et al.

(10) Patent No.: US 10,072,342 B2
(45) Date of Patent: Sep. 11, 2018

(54) INTEGRATED ELECTROCHEMICAL COMPRESSOR AND CASCADE STORAGE METHOD AND SYSTEM

(71) Applicant: NUVERA FUEL CELLS, INC., Billerica, MA (US)

(72) Inventors: Adam Prescott, Westford, MA (US); Bryan Gordon, Goffstown, NH (US)

(73) Assignee: NUVERA FUEL CELLS, LLC, Billerica, MA (US)

( * ) Notice: Subject to any disclaimer, the term of this patent is extended or adjusted under 35 U.S.C. 154(b) by 473 days.

(21) Appl. No.: 14/470,156

(22) Filed: Aug. 27, 2014

(65) Prior Publication Data

US 2015/0060294 A1    Mar. 5, 2015

Related U.S. Application Data

(60) Provisional application No. 61/870,895, filed on Aug. 28, 2013.

(51) Int. Cl.
*B65B 1/30* (2006.01)
*C25B 1/12* (2006.01)
(Continued)

(52) U.S. Cl.
CPC .............. *C25B 1/12* (2013.01); *B01D 53/326* (2013.01); *C01B 3/38* (2013.01); *C25B 9/06* (2013.01);
(Continued)

(58) Field of Classification Search
CPC .... F17C 5/06; F17C 5/007; F17C 6/00; F17C 7/00; F17C 2227/043; B01D 53/326;
(Continued)

(56) References Cited

U.S. PATENT DOCUMENTS 3,643,677 A * 2/1972 Begleiter .................. B64B 1/62
137/113
3,719,196 A * 3/1973 McJones .................... F17B 1/12
137/110
(Continued)

FOREIGN PATENT DOCUMENTS

JP        08-100890        4/1996
JP        2004-293752      10/2004
(Continued)

OTHER PUBLICATIONS

Christina Wulf, Martin Kaltschmitt, Life cycle assessment of hydrogen supply chain with special attention on hydrogen refueling stations, International Journal of Hydrogen Energy, Apr. 6, 2012, pp. 16711-16721, vol. 37, No. 21, Elsevier Ltd. See paragraph [01.2] and Figure 1.

(Continued)

*Primary Examiner* — Timothy L Maust
*Assistant Examiner* — Randall Gruby
(74) *Attorney, Agent, or Firm* — Finnegan, Henderson, Farabow, Garrett & Dunner LLP

(57) ABSTRACT

The present disclosure is directed to a compressed fuel storage system. The compressed fuel storage system may include an electrochemical compressor and one or more fuel dispensing units. The electrochemical compressor may be configured to compress a fuel source. Additionally, the compressed fuel storage system may include at least one low pressure compressed fuel reservoir fluidly connected to the electrochemical compressor and the fuel dispensing units and at least one high pressure compressed fuel reservoir fluidly connected to the electrochemical compressor and the fuel dispensing units.

13 Claims, 2 Drawing Sheets

(51) Int. Cl.
*C25B 9/06* (2006.01)
*B01D 53/32* (2006.01)
*H01M 8/0656* (2016.01)
*C01B 3/38* (2006.01)
*H01M 8/0662* (2016.01)
*H01M 8/1018* (2016.01)

(52) U.S. Cl.
CPC ....... *H01M 8/0656* (2013.01); *B01D 2256/16* (2013.01); *B01D 2259/4525* (2013.01); *B01D 2259/4566* (2013.01); *H01M 8/0681* (2013.01); *H01M 2008/1095* (2013.01); *Y02E 60/366* (2013.01); *Y10T 137/0396* (2015.04)

(58) Field of Classification Search
CPC .......... H01M 8/0656; C01B 3/38; C25B 9/06; C25B 1/12
See application file for complete search history.

(56) References Cited

U.S. PATENT DOCUMENTS

| | | | | | |
|---|---|---|---|---|---|
| 3,844,306 | A | * | 10/1974 | Hill | F17C 5/06 137/256 |
| 3,847,173 | A | * | 11/1974 | Hill | F17C 5/002 137/110 |
| 4,523,548 | A | * | 6/1985 | Engel | F02B 43/00 123/1 A |
| 4,990,412 | A | * | 2/1991 | Hersey | F25B 9/02 204/DIG. 4 |
| 5,107,906 | A | * | 4/1992 | Swenson | F17C 9/02 141/11 |
| 5,406,988 | A | * | 4/1995 | Hopkins | F17C 7/00 123/527 |
| 5,409,046 | A | * | 4/1995 | Swenson | F17C 9/02 141/11 |
| 5,673,735 | A | * | 10/1997 | Crvelin | F17C 13/045 137/256 |
| 5,884,675 | A | * | 3/1999 | Krasnov | F17C 5/06 141/18 |
| 5,901,758 | A | * | 5/1999 | Hwang | F17C 5/06 141/18 |
| 6,598,624 | B2 | * | 7/2003 | Togasawa | F16K 17/30 141/1 |
| 6,708,573 | B1 | * | 3/2004 | Cohen | F17C 5/007 73/865 |
| 6,755,225 | B1 | * | 6/2004 | Niedwiecki | B60P 3/14 141/18 |
| 6,786,245 | B1 | * | 9/2004 | Eichelberger | B60S 5/02 141/18 |
| 6,792,981 | B1 | * | 9/2004 | Manning | F17C 5/06 141/18 |
| 7,059,364 | B2 | * | 6/2006 | Kountz | F17C 9/02 141/197 |
| 7,169,281 | B2 | * | 1/2007 | Juda | B01D 53/228 204/252 |
| 7,325,561 | B2 | * | 2/2008 | Mathison | B60K 15/00 137/256 |
| 8,365,777 | B2 | * | 2/2013 | Farese | F17C 13/026 141/4 |
| 8,899,278 | B2 | * | 12/2014 | Cohen | F17C 7/02 141/104 |
| 8,899,279 | B2 | * | 12/2014 | Safronovs | F04B 9/1253 141/198 |
| 9,243,753 | B2 | * | 1/2016 | Wonders | F17C 5/06 |
| 2003/0164202 | A1 | * | 9/2003 | Graham | B60S 5/02 141/98 |
| 2004/0040862 | A1 | | 3/2004 | Kosek et al. | |
| 2004/0118476 | A1 | * | 6/2004 | Borck | F17C 5/06 141/4 |
| 2004/0211679 | A1 | * | 10/2004 | Wong | B01D 53/326 205/765 |
| 2005/0056661 | A1 | * | 3/2005 | Casamatta | H01M 8/04089 222/3 |
| 2005/0136313 | A1 | * | 6/2005 | Van Dine | H01M 8/04089 429/411 |
| 2006/0029851 | A1 | * | 2/2006 | Santiago | F04B 17/00 429/410 |
| 2006/0156742 | A1 | * | 7/2006 | Farese | F17C 5/06 62/50.2 |
| 2007/0034283 | A1 | * | 2/2007 | Plummer | F17C 6/00 141/234 |
| 2007/0051423 | A1 | * | 3/2007 | Handa | F17C 5/00 141/94 |
| 2007/0079891 | A1 | * | 4/2007 | Farese | F17C 5/007 141/94 |
| 2007/0125441 | A1 | * | 6/2007 | Farese | F17C 5/06 141/2 |
| 2007/0128478 | A1 | * | 6/2007 | Ballantine | H01M 8/04097 429/410 |
| 2007/0128479 | A1 | * | 6/2007 | Ballantine | H01M 8/04007 429/414 |
| 2007/0231619 | A1 | * | 10/2007 | Strobel | C25B 9/203 429/457 |
| 2008/0000542 | A1 | * | 1/2008 | Cohen | F17C 5/007 141/18 |
| 2008/0110514 | A1 | * | 5/2008 | Yoshida | H01M 8/04089 137/628 |
| 2008/0209916 | A1 | * | 9/2008 | White | F17C 5/02 62/48.1 |
| 2009/0151809 | A1 | * | 6/2009 | Balasubramanian | F17C 5/007 141/3 |
| 2009/0151812 | A1 | * | 6/2009 | Allidieres | F17C 5/007 141/11 |
| 2009/0229701 | A1 | * | 9/2009 | Allidieres | F17C 5/06 141/2 |
| 2009/0236006 | A1 | * | 9/2009 | Farese | F17C 5/007 141/3 |
| 2009/0250138 | A1 | * | 10/2009 | Bavarian | F17C 7/00 141/4 |
| 2010/0037982 | A1 | * | 2/2010 | Bangs | F17C 5/002 141/9 |
| 2010/0059138 | A1 | * | 3/2010 | Shi | F17C 5/06 141/5 |
| 2010/0132386 | A1 | | 6/2010 | Behar | |
| 2010/0193070 | A1 | * | 8/2010 | Allidieres | F17C 5/06 141/11 |
| 2010/0266923 | A1 | * | 10/2010 | McElroy | B01D 53/22 429/444 |
| 2011/0022337 | A1 | * | 1/2011 | MacRon | F17C 5/06 702/55 |
| 2013/0248000 | A1 | * | 9/2013 | Killeen | F17D 3/00 137/14 |
| 2014/0110017 | A1 | * | 4/2014 | Gupta | F17C 5/007 141/4 |

FOREIGN PATENT DOCUMENTS

| | | | |
|---|---|---|---|
| JP | 2008-513336 | 5/2008 | |
| WO | WO 03/075379 A2 | 9/2003 | |
| WO | WO 2006/031871 A1 | 3/2006 | |
| WO | WO 2012123349 A1 * | 9/2012 | ............. F17C 5/007 |

OTHER PUBLICATIONS

B. Rohland, K. Eberle, R. Strobel, J. Scholta, J. Garche, Electrochemical hydrogen compressor, Electrochimica Acta, Feb. 6, 1998, pp. 3841-3846, vol. 43, No. 24, Elsevier Science Ltd.
PCT Search Report dated Dec. 5, 2014.
Examination Report issued by European Patent Office for EP Application No. 14771423.2, dated Aug. 9, 2017 (7 pages).
Australian Patent Application No. 2014312438: Examination Report No. 1, dated Dec. 13, 2017 (5 pages).
Official Action cited in Japanese Patent Application No. 2016-537812, dated Jun. 1, 2018 (3 pages).

* cited by examiner

INTEGRATED ELECTROCHEMICAL COMPRESSOR AND CASCADE STORAGE METHOD AND SYSTEM

This application claims the benefit of U.S. Provisional Application No. 61/870,895, filed Aug. 28, 2013, which is incorporated herein by reference.

The present disclosure relates to an integrated electrochemical compressor and cascade storage methods and systems. According to an exemplary embodiment, the system and method can be used for refueling hydrogen powered vehicles.

Electrochemical cells, usually classified as fuel cells or electrolysis cells, are devices used for generating current from chemical reactions, or inducing a chemical reaction using a flow of current. A fuel cell converts the chemical energy of a fuel (e.g., hydrogen, natural gas, methanol, gasoline, etc.) and an oxidant (e.g., air or oxygen) into electricity and produces heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms can electrochemically split into electrons and protons (hydrogen ions) at the anode. The electrons flow through the circuit to the cathode and generate electricity, while the protons diffuse through the electrolyte membrane to the cathode. At the cathode, hydrogen protons can react with electrons and oxygen (supplied to the cathode) to produce water and heat.

An electrolysis cell represents a fuel cell operated in reverse. A basic electrolysis cell can function as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion.

An electrochemical hydrogen compressor (EHC), for example, can be used to selectively transfer hydrogen from one side of a cell to another. EHCs operating in this manner are sometimes referred to as hydrogen pumps. When the hydrogen accumulated at the second electrode is restricted to a confined space, the electrochemical cell compresses the hydrogen or raises the pressure within the confined space. The maximum pressure or flow rate an individual cell is capable of producing can be limited based on the cell design.

Hydrogen has emerged as a viable alternative to traditional power sources (i.e., fossil fuels). Successful commercialization of hydrogen as an energy carrier and the long-term sustainability of a "hydrogen economy" depends largely on the efficiency and cost-effectiveness of fuel cells, electrolysis cells, hydrogen manipulation/management systems (e.g., EHCs), and hydrogen distribution systems (e.g., dispensing stations). Gaseous hydrogen is a convenient and efficient means of energy storage, usually by pressurized containment. Advantageously, storing hydrogen at high pressure yields high energy density.

However, efficiently dispensing hydrogen to vehicles as part of a fully integrated "hydrogen economy" presents challenges. For example, how is a dispensing station able to handle a high volume of vehicle traffic while still being able to provide each vehicle with a full tank? A hydrogen tank can be rated for a design pressure and filling to the design pressure can maximize the range of the vehicle. In order for a station to be able to handle high volume traffic and ensure each customer receives a full fill, the station must have a large capacity high pressure hydrogen storage tank which can be costly and inefficient.

A typical gaseous fueling station employs a cascade storage system, which divides stored fuel into several separate tanks. For example, one version can employ three tanks—low, mid and high pressure. The vehicle is first connected to the low pressure tank and equalized, then to the mid, and lastly to the high pressure tank. This methodology maximizes the utilization of stored gas by reducing the mass removed from the high pressure tank in order to top off the vehicle. Not only is more energy required to store the gas at the high pressure of the high tank, but the tank itself can be more expensive to manufacture in order to safely store the gas at this high pressure level.

The typical gaseous fueling station also utilizes a compressor to compress a fuel source and deliver it to either the low, mid, or high pressure fuel tank. Mechanical compression is the most common way for the compressor to achieve the desired pressurization (i.e. low, mid, or high). Mechanical compression generally includes wherein gas is compressed within a chamber by a piston or diaphragm. However, mechanical compression suffers from intensive energy use, wear and tear of moving parts, hydrogen embrittlement, excessive noise, bulky equipment, and contamination of gas by lubricants.

An electrochemical hydrogen compressor provides another system to compress a fuel source to the desired pressurization, and generally includes stacks of membrane-electrode assemblies (MEAs) separated by proton exchange membranes (PEMs). Each MEA includes a cathode, an electrolyte membrane, and an anode. Hydrogen gas is introduced to the anode side of an MEA and oxidized, with an electric potential, to produce protons and electrons. The protons are driven across the electrolyte membrane to the cathode, and rejoined with the electrons to form compressed hydrogen.

Electrochemical compressors generally include a stack of multiple seals and/or membranes that are sensitive to damage during rapid pressure changes. A compressor used in a cascade storage system may experience rapid pressure changes when sequencing from one storage tank (e.g. high pressure fuel tank) to another storage tank (e.g. low pressure fuel tank). Such rapid pressure changes may be substantially instantaneously, and may be as high as several thousand pounds per square inch per second. These rapid pressure changes may damage an electrochemical compressor in a number of ways. For example, the seals of an electrochemical compressor may be damaged due to explosive decompression, excessive swelling, or extrusion. Alternatively or additionally, the rapid pressure changes may cause membrane failure due to similar damage mechanisms.

In consideration of the aforementioned circumstances, the present disclosure provides a system and method for an integrated electrochemical compressor and cascade storage of hydrogen. One embodiment of the present disclosure is directed to a compressed fuel dispensing station. The compressed fuel dispensing station may comprise an electrochemical compressor and one or more fuel dispensing units. The electrochemical compressor may be configured to compress a fuel source. Additionally, the compressed fuel dispensing station may include at least one low pressure compressed fuel reservoir fluidly connected to the electrochemical compressor and one or more fuel dispensing units and at least one high pressure compressed fuel reservoir fluidly connected to the electrochemical compressor and one or more fuel dispensing units.

Another embodiment of the present disclosure is directed to a method of maintaining pressure within a compressed fuel dispensing station. The method may include compressing a fuel source with a compressor, and directing fuel from the compressor to a first fuel reservoir. Additionally, the method may include determining that the first fuel reservoir has reached a target fill pressure, and transiting from the first fuel reservoir to a second fuel reservoir by redirecting the fuel to the second fuel reservoir. The method may further include opening a flow limiting valve to maintain the rate of pressure change of the compressor to an allowable rate of pressure change when transitioning from the first fuel reservoir to the second fuel reservoir.

It is to be understood that both the foregoing general description and the following detailed description are exemplary and explanatory only, and are not restrictive of the disclosure, as claimed.

The accompanying drawings, which are incorporated in and constitute a part of this specification, illustrate several embodiments of the present disclosure and together with the description, serve to explain the principles of the disclosure.

Reference will now be made in detail to the present exemplary embodiments of the disclosure, examples of which are illustrated in the accompanying drawings. Wherever possible, the same reference numbers will be used throughout the drawings to refer to the same or like parts.

Figure 1:
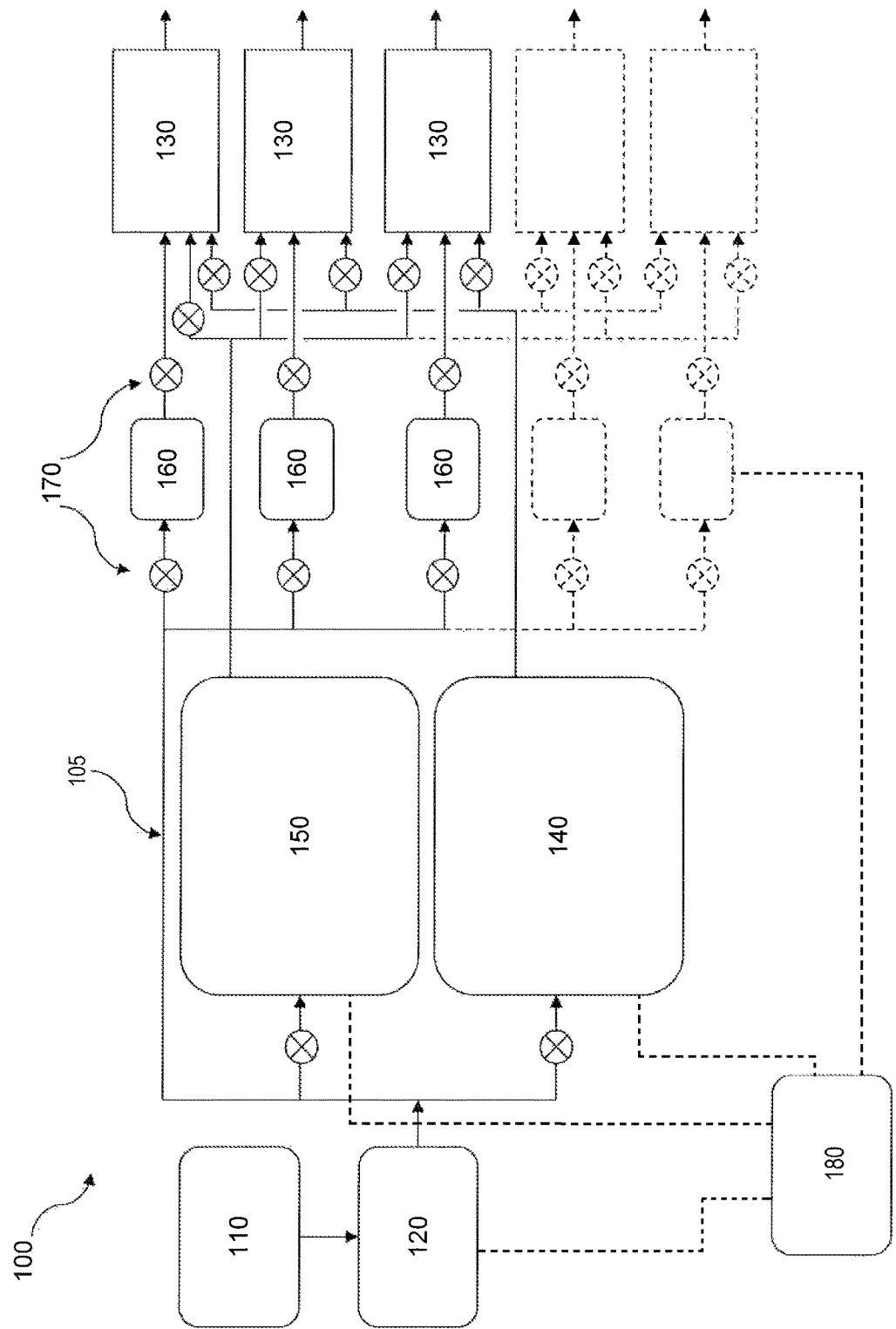
FIG. 1 shows a schematic diagram of a compressed fuel dispensing station, according to an exemplary embodiment.

FIG. 1 shows a schematic diagram of a compressed fuel dispensing station (CFDS) 100, according to an exemplary embodiment. CFDS 100 may comprise a fuel source 110, a compressor 120, one or more fuel dispensing units 130, at least one low pressure compressed fuel reservoir (LPCFR) 140, at least one medium pressure compressed fuel reservoir (MPCFR) 150, and at least one high pressure compressed fuel reservoir (HPCFR) 160. Circuitry 105 may direct fluid from fuel source 110 to compressor 120 and to either LPCFR 140, MPCFR 150, or HPCFR 160 using one or more valves 170. A controller 180 may be in communication with compressor 120, LPCFR 140, MPCFR 150, HPCFR 160, and valves 170.

CFDS 100 may be configured to dispense fuel according to a cascade fueling arrangement. For example, each fuel dispensing unit 130 may be configured to first supply low pressure fuel from LPCFR 140, then supply medium pressure fuel from MPCFR 150, and finally top off a vehicle with high pressure fuel from HPCFR 160 to ensure the vehicle receives a full fill to optimal pressure (i.e., 700 bara to 900 bara).

In other embodiments, a vehicle may be filled starting with medium pressure fuel or even high pressure fuel. This may depend on the initial condition of the vehicle tank and supply. For example, if a vehicle tank is nearly full (i.e., at a high pressure and volume), the low pressure and medium pressure fuel supplies will not be beneficial. Instead, just the high pressure fuel supply may be used to top off the tank.

As shown in FIG. 1, fuel source 110 may be in fluid communication with compressor 120. Compressor 120 can be in fluid communication with LPCFR 140, MPCFR 150, and HPCFR 160. One or more of valves 170 may be positioned between these components of CFDS 100 such that flow of a fluid from one component to another may be selectively controlled. For example, each fuel reservoir may be isolated from compressor 120 or other fuel reservoirs.

Fuel source 110 may include a fuel generator, for example a natural gas reforming system or an electrolysis system or unit configured to produce hydrogen gas. In another embodiment, fuel source 110 may include an underground distribution network or reservoir tank configured to receive periodic shipments of hydrogen gas or liquid. It is contemplated that other compressed gas sources may be utilized. For example, fuel source 110 may include a source of natural gas or propane.

Compressor 120 may be configured to receive a fuel from fuel source 110, compress, and discharge the fuel to a fuel reservoir at an increased pressure. According to an exemplary embodiment, compressor 120 may be an electrochemical hydrogen compressor (EHC). In various other embodiments compressor 120 may take the form of a mechanical compressor or other comparable compression devices.

LPCFR 140 as shown in FIG. 1 may include one or more chambers or tanks configured to contain a compressed fuel. LPCFR 140 may be configured to be mounted above ground or buried below ground. LPCFR 140 may range in volume from about 1L to about 5,000L and may be rated for pressure between about 500 psi and about 15,000 psi.

MPCFR 150 as shown in FIG. 1 may include one or more chambers or tanks configured to contain a compressed fuel. MPCFR 150 may be configured to be mounted above ground or buried below ground. MPCFR 150 may range in volume from about 1L to about 5,000L and may be rated for pressure between about 500 psi and about 15,000 psi.

According to various embodiments, LPCFR 140 and MPCFR 150 may have substantially equal volumes or in alternate embodiments one may be larger than the other, depending on the requirements of CFDS 100.

HPCFR 160 as shown in FIG. 1 may include one or more chambers or tanks configured to contain a compressed fuel. HPCFR 160 may be configured to be mounted above ground or buried below ground. HPCFR 160 may range in volume from about 0.25L to about 2,000L and may be rated for pressure between about 1,000 psi and about 15,000 psi. According to an exemplary embodiment, any HPCFR 160 may be smaller in volume than LPCFR 140 and MPCFR 150 to allow for more rapid refill of an HPCFR 160 after a top of a vehicle from the corresponding fuel dispensing unit 130.

Fuel dispensing units 130 may be configured to dispense compressed fuel to the vehicle, container, or other device configured to receive compressed fuel. Fuel dispensing units 130 may comprise one or more fuel dispensing devices 130. Each fuel dispensing unit 130 may be configured to receive and dispense fuel from LPCFR 140, MPCFR 150, and HPCFR 160. Each fuel dispensing unit 130 may contain isolation valves, check valves, flow regulators, and instrumentation configured to safely and efficiently regulate and control the distribution and discharge of the compressed gas.

Figure 2:
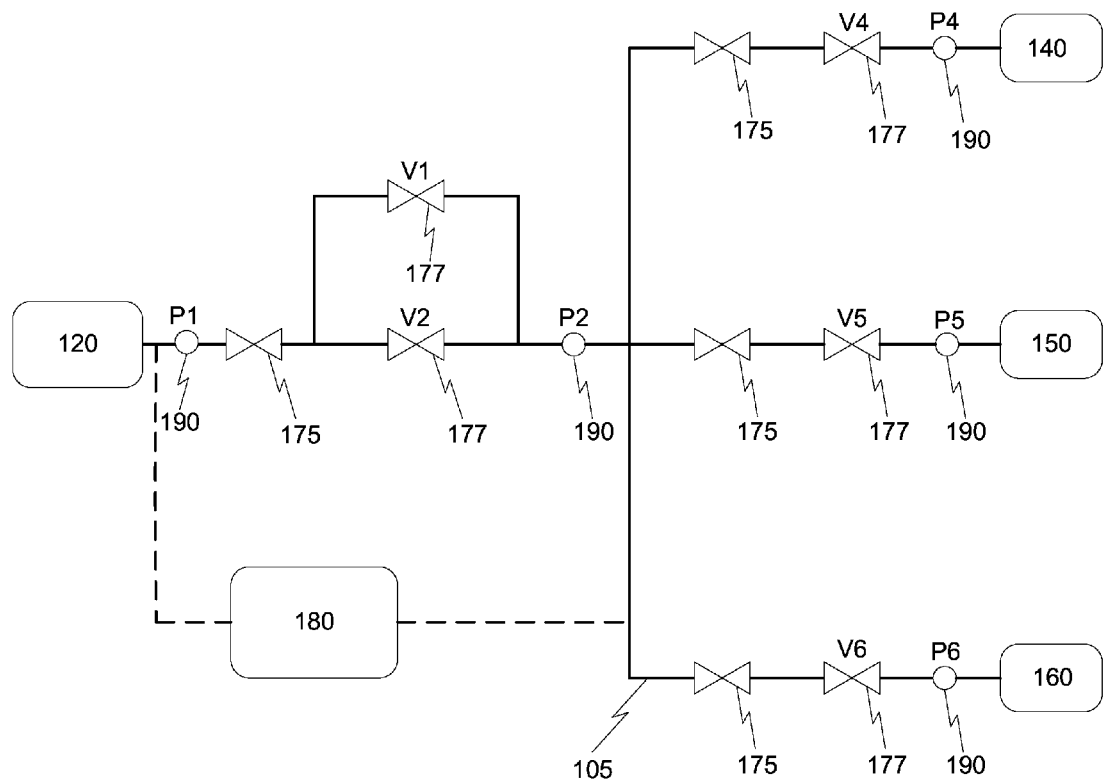
FIG. 2 shows a schematic diagram of the circuitry of a compressed fuel dispensing station, according to an exemplary embodiment.

Controller 180 may be configured to regulate the flow of fluid to LPCFR 140, MPCFR 150, and HPCFR 160 based on the relative pressure within each fuel reservoir. Controller 180 may embody, for example, one or more general microprocessors capable of controlling numerous functions of CFDS 100. Controller 180 may include a memory, a secondary storage device, a processor (e.g., a CPU), or any other components for executing programs to perform the disclosed functions of CFDS 100. Various other circuits may be associated with controller 180, such as power supply circuitry, signal conditioning circuitry, data acquisition circuitry, signal output circuitry, signal amplification circuitry, and other types of circuitry known in the art. As shown in FIG. 2, controller 180 may be in communication with various components of CFDS 100 including LPCFR 140, MPCFR 150, HPCFR 160, compressor 120, valves 170, and sensors 190

Valves 170 may include check valves 175 and a plurality of control valves 177. Check valves 175 may be configured to prevent reverse backflow through circuitry 105, for example, reverse backflow into compressor 120. Control valves 177 may be configured to control the flow of fluid through circuitry, and may be manually or automatically operated. As shown in FIG. 2, control valves may include valves V1, V2, V4, V5, and V6 disposed downstream of compressor 120 and upstream of LPCFR 140, MPCFR 150, and HPCFR 160. Valve V1 may be disposed in parallel to valve V2. Additionally, valves V1 and V2 may be disposed in series with valves V4, V5, and V6. In one embodiment, valve V2 may include a flow limiting valve configured to regulate the change in pressure of fuel from compressor 120, as discussed in greater detail below. This may reduce pressure changes felt by the stacks of MEAs of compressor 120, and therefore reduce damage to compressor 120.

As shown in FIG. 2, circuitry 105 may additionally include one or more sensors 190. In some embodiments, sensors 190 may include pressure sensors configured to measure the pressure within the fuel reservoirs. For example, sensor P4 may be configured to measure the pressure of LPCFR 140, sensor P5 may be configured to measure the pressure of MPCFR 150, and sensor P6 may be configured to measure the pressure of HPCFR 160. Additionally, sensors P1 and P2 may be configured to measure the pressure of compressor 120.

In operation, valve V1 may remain open when compressor 120 delivers fuel to a fuel reservoir. Additionally, the valve associated with the fuel reservoir may remain open while the fuel flows into the fuel reservoir. Therefore, for example, valves V1 and V4 may remain open while compressor 120 delivers fuel to LPCFR 140. Similarly, valves V1 and V5 may remain open while compressor 120 delivers fuel to MPCFR 150, and valves V1 and V6 may remain open while compressor delivers fuel to HPCFR 160.

Compressor 120 may continue to deliver the fuel reservoir until it has reached its target fill pressure. In some embodiments, sensors 190 may measure the pressure within a fuel reservoir to determine if the pressure has reached the target fill pressure. Controller 180 may receive the pressure information from sensors 190 and determine if the fuel reservoir has reached its target fill pressure. Furthermore, the target fill pressure may be based on variable parameters, including environmental and mechanical parameters, and defined by programmable logic of controller 180. Therefore, the target fill pressure may vary and change with operation of CFDS 100. Additionally, each fuel reservoir, LPCFR 140, MPCFR 150, and HPCFR 160, may have a unique target fill pressure. HPCFR 160 may have the highest target fill pressure and LPCFR 140 may have the lowest target fill pressure. In one example, compressor 120 may continue to feed LPCFR 140 until sensor P4 indicates that LPCFR 140 has reached its target fill pressure. Similarly, compressor 120 may continue to feed MPCFR 150 until sensor P5 indicates that MPCFR 150 has reached its target fill pressure. In another example, compressor 120 may continue to feed HPCFR 160 until sensor P6 determines that HPCFR 160 has reached its target fill pressure.

When a fuel reservoir has reached its target fill pressure, the cascade storage system may notify compressor 120 that the fuel reservoir is full. For example, the cascade storage system may notify compressor 120 that MPCFR 150 has reached its target pressure and is full. CFDS 100 may transition to feed another fuel reservoir, for example LPCFR 140.

When transitioning from a higher pressure fuel reservoir to a lower pressure fuel reservoir or from a lower pressure fuel reservoir to a higher pressure fuel reservoir, controller 180, or any other control system associated with compressor 120, may direct valve V1 to close and valve V2 to open. Valve V2 may limit and maintain the change in pressure from compressor 120 at a controlled rate such that compressor 120 does not experience a rapid pressure change. For example, valve V2 may include a variable orifice valve or a variable back pressure valve regulator automatically controlled via an electric motor or pneumatic actuation mechanism.

Valve V2 may initially open at a predetermined flow rate, wherein the predetermined flow rate may match an allowable rate of pressure change (dP/dt rate) of compressor 120. Therefore, the fuel delivered from compressor 120, measured by sensor P1, may not exceed the allowable dP/dt rate. The allowable dP/dt rate of compressor 120 may be the maximum dP/dt rate of compressor 120, based on the mechanics of compressor 120, or an amount determined by controller 180.

As the pressure of compressor 120 at P1 begins to equalize with the pressure demanded of the fuel reservoir (e.g. P4, P5, P6), valve V2 may continue to open further at a controlled rate. However, valve V2 may ensure that the pressure change does not exceed the allowable dP/dt rate of compressor 120. Once the valve V2 has opened sufficiently such that the pressures at P1 and P2 have equalized, valve V2 may close and valve V1 may reopen. Therefore, fuel will continue to be dispensed to the fuel reservoir through V1 until the fuel reservoir has reached its target fill pressure.

In one example, when transitioning from a high pressure fuel reservoir to a lower pressure fuel reservoir, for example from MPCFR 150 to LPCFR 140, compressor 120 may first receive notification of this transition. Valve V1 may close and valve V2 may open such that fuel from compressor 120 may be redirected through valve V2. Additionally, valve V5 may close and valve V4 may open such the fuel is redirected from MPCFR 150 to LPCFR 140. In this embodiment, valve V2 may open such that the pressure change in compressor 120 is controlled. For example, valve V2 may initially open with a smaller diameter orifice and may gradually increase the diameter to allow a controlled and gradual decrease in pressure from compressor 120.

The rate of pressure change may not exceed the allowable dP/dt rate of compressor 120. Valve V2 may continue to increase the diameter of the orifice until the pressure of compressor 120 is substantially equal to the pressure of LPCFR 140 (i.e. pressure at P1 is substantially equal to pressure at P2 and pressure at P4). At this time, valve V2 may be closed and valve V1 may be reopened. Fuel may flow from compressor to LPCFR 140 until LPCFR 140 has reached its target fill pressure.

In another example, when transitioning from a low pressure fuel reservoir to a high pressure fuel reservoir, for example from LPCFR 140 to HPCFR 160, compressor 120 may first receive notification of this transition. Valve V1 may close and valve V2 may open such that fuel from compressor 120 may be redirected through valve V2. . In this embodiment, valve V2 may open such that the pressure change in compressor 120 is controlled. For example, valve V2 may initially open with a larger diameter orifice and may gradually decrease the diameter to allow a controlled and gradual increase in pressure from compressor 120. The rate of pressure change may not exceed the allowable dP/dt rate of compressor 120. Valve V2 may continue to decrease the diameter of the orifice until the pressure of compressor 120 is substantially equal to the pressure of HPCFR 160 (i.e. pressure at P1 is substantially equal to pressure at P2 and pressure at P6). At this time, valve V4 may close and valve V6 may open such the fuel is redirected from LPCFR 140 to HPCFR 160 and valve V2 may be closed and valve V1 may be reopened. Fuel may flow from compressor to HPCFR 160 until HPCFR 160 has reached its target fill pressure.

The process may further comprise supplying a vehicle with a fuel to full fill by first releasing low pressure fuel, then releasing medium pressure fuel, and then finally achieving full fill by releasing high pressure fuel into the vehicle. In addition, the process may include distributing the fuel based on priority and fuel dispensing unit utilization.

When CFDS 100 is idle, for example when CFDS 100 is not being used to fill a vehicle and/or supply fluid to the fuel reservoirs, all valves 170 may be closed. Therefore, fuel may not flow through valves V1, V2, V4, V5, and V6 and into LPCFR 140, MPCFR 100, and HPCFR 160.

It is further contemplated that additional fuel reservoirs may be used than depicted in the figures. For example, CFDS 100 may include two LPCFR 140, two MPCFR 150, and at least two HPCFR 160. Additionally, the volume and number of the LPCFR 140, MPCFR 150, and HPCFR 160 can be varied in consideration of a variety of factors, for example, site space limitations, cost, station capacity, performance, and the like.

CFDS 100 may further comprise a plurality of compressors 120 (not shown). For example, a first compressor 120 may be in communication with LPCFR 140 and MPCFR 150. Accordingly, the first compressor 120 may scavenge hydrogen from LPCFR 140, and may compress the hydrogen and discharge it to MPCFR 150. The second compressor may be in fluid communication with MPCFR 150 and HPCFR 160, and may scavenge hydrogen from MPCFR 150 and compress the hydrogen and discharge it to HPCFR 160. In an alternate embodiment (not shown), the first compressor 120 may be configured to discharge the compressed hydrogen directly to HPCFR 160. In the embodiment of FIG. 2, compressor 120 may be configured to scavenge hydrogen from LPCFR 140, MPCFR 150, or both and deliver that hydrogen to MPCFR 150, HPCFR 160, or both.

Utilizing the integrated electrochemical compressor and cascade storage system of the present disclosure may isolate the compressor from the cascade storage system and therefore reduce damage to the compressor. For example, the compressor may not feel the effects of rapid pressure changes associated with traditional compressed fuel dispensing stations. Therefore, the compressor may have a longer life with enhanced compression abilities.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. A compressed fuel storage system comprising:
   an electrochemical compressor configured to compress a fuel source;
   at least one low pressure compressed fuel reservoir fluidly connected to the electrochemical compressor;
   at least one high pressure compressed fuel reservoir fluidly connected to the electrochemical compressor;
   a flow limiting valve configured to limit the rate of pressure change of the electrochemical compressor to an allowable rate of pressure change; and
   a valve configured to close when the rate of pressure change of the electrochemical compressor exceeds the allowable rate of pressure change.

2. The compressed fuel storage system of claim 1, further comprising at least one medium pressure compressed fuel reservoir fluidly connected to the electrochemical compressor.

3. The compressed fuel storage system of claim 2, further comprising one or more fuel dispensing units fluidly connected to the medium pressure compressed fuel reservoir.

4. The compressed fuel storage system of claim 1, further comprising one or more fuel dispensing units fluidly connected to the low pressure compressed fuel reservoir.

5. The compressed fuel storage system of claim 1, wherein the flow limiting valve is further configured to limit the rate of pressure change of the electrochemical compressor to the allowable rate of pressure change when transitioning from the low pressure compressed fuel reservoir to the high pressure compressed fuel reservoir.

6. The compressed fuel storage system of claim 5, wherein the allowable rate of pressure change is substantially equal to a maximum pressure change rate of the electrochemical compressor.

7. The compressed fuel storage system of claim 5, further comprising a controller configured to regulate the flow limiting valve based on input from one or more pressure sensors.

8. The compressed fuel storage system of claim 7, further including one or more control valves in communication with the controller, the control valves configured to open or close to selectively direct fuel to the low pressure compressed fuel reservoir and to the high pressure compressed fuel reservoir.

9. The compressed fuel storage system of claim 1, wherein the flow limiting valve is further configured to limit the rate of pressure change of the electrochemical compressor to the allowable rate of pressure change when transitioning from the high pressure compressed fuel reservoir to the low pressure compressed fuel reservoir.

10. The compressed fuel storage system of claim 9, wherein the allowable rate of pressure change is substantially equal to a maximum pressure change rate of the electrochemical compressor.

11. The compressed fuel storage system of claim 9, further comprising a controller configured to regulate the flow limiting valve based on input from one or more pressure sensors.

12. The compressed fuel storage system of claim 11, further including one or more control valves in communication with the controller, the control valves configured to open or close to selectively direct fuel to the low pressure compressed fuel reservoir and to the high pressure compressed fuel reservoir.

13. The compressed fuel storage system of claim 1, wherein the fuel source includes at least one of hydrogen, natural gas, and propane.

* * * * *